United States Patent [19]
Dente et al.

[11] Patent Number: 5,233,585
[45] Date of Patent: Aug. 3, 1993

[54] ACQUIRING FOCUS IN AN OPTICAL DISK SYSTEM USING A TIME AND SHAPE MODIFIED FOCUS ERROR SIGNAL

[75] Inventors: James J. Dente; Alan A. Fennema, both of Tucson, Ariz.

[73] Assignee: International Business Machines Corporation, Armonk, N.Y.

[21] Appl. No.: 757,796

[22] Filed: Sep. 11, 1991

[51] Int. Cl.⁵ .............................................. G11B 7/09
[52] U.S. Cl. .............................. 369/44.27; 369/44.75; 369/44.34; 250/201.5
[58] Field of Search ............... 369/44.27, 44.25, 44.23, 369/44.28, 44.29, 44.32, 44.34, 44.41, 112; 250/201.2, 201.4, 201.5

[56] References Cited

U.S. PATENT DOCUMENTS

| | | | |
|---|---|---|---|
| 3,68.526 | 1/1983 | Hariage et al. | 369/44.25 |
| 3,883,689 | 5/1975 | Monsour et al. | 358/93 |
| 4,674,076 | 6/1987 | Hsieh et al. | 369/44.29 |
| 4,705,941 | 11/1987 | Yamada et al. | 250/201 |
| 4,733,066 | 3/1988 | Konno et al. | 369/44.29 |
| 5,103,439 | 4/1992 | Bierhoff et al. | 369/44.27 |

FOREIGN PATENT DOCUMENTS 3438442 10/1984 Fed. Rep. of Germany .

Primary Examiner—Aristotelis Psitos
Assistant Examiner—Muhammad Edun
Attorney, Agent, or Firm—H. F. Somermeyer

[57] ABSTRACT

The focus acquire system on optical disk recorder as well as other optical systems, signal processes a focus error signal FES to produce a modified FES which has a peak amplitude occurring closer to a desired focus position than the occurrence of peak amplitude of the FES. The modified FES also is signal processed to sharpen or slim the peak portion such that increasing the amplitude of the modified FES reaches an amplitude detection threshold closer to the true peak of the modified FES, and hence closer to the desired focus position than if the amplitude detection threshold were used on the FES. In a preferred form of the invention, FES is differentiated to produce a differentiated FES, then the differentiated FES is subtracted from FES to produce the modified FES.

12 Claims, 4 Drawing Sheets

ACQUIRING FOCUS IN AN OPTICAL DISK SYSTEM USING A TIME AND SHAPE MODIFIED FOCUS ERROR SIGNAL

FIELD OF THE INVENTION

The present invention relates to optical systems, particularly focusing systems and the acquisition of focus in such systems. The present invention is particularly useful for optical disk recorders.

BACKGROUND OF THE INVENTION

Optical disk recorders, in particular, employ objective lens having very small size and mass. Typically, such objective lenses are slidably mounted on a moveable support such that the beam passing through the objective lens is appropriately focused and positioned with respect to a record member. Generally, the acquisition of focus i.e., the movement of the objective lens to an in-focus position wherein the laser or other light beam is appropriately focused at the recording level, should be reliably accomplished for preventing retrys and delays in using an optical disk recorder. Also the best focus should be quickly and accurately obtained. It is desired also to ensure that the control of the focus acquisition is simplified for reducing costs of the optical system.

One of the problems involved in accurately acquiring focus is that the focus error signal FES does not provide accurate information as to the lens out-of-focus position during initial lens motion toward the focus plane. Further, a rotating optical disk is subject to axial motions (wow) further complicating acquiring a best focus position for the lens. Because of such axial motions, a lens when at its best focus position, in maintaining such best focus moves axially with the optical disk several millimeters. The focus maintenance is achieved using a so-called linear region of the focus error signal about the best focus position. On the other hand, the depth of field of such lens is in the order of a few microns; therefore, it is desired to accurately and quickly detect a near focus condition which enables a focus servo to reliably and quickly establish focus maintaining operations. Such quick focus acquisition preferably should involve but a single reliable detection action which accommodates a large range of axial lens speeds at focus acquisition time.

DISCUSSION OF THE PRIOR ART

Konno et al. U.S. Pat. No. 4,733,066 shows a typical prior art focus acquisition system in which focus acquisition is acquired during a so-called open loop mode. Then, upon detecting an in-focus condition, a focus maintenance servo is actuated for maintaining the focus of the objective lens. Konno et al. also show the typical control signal having a ramp shape for moving the objective lens to the in-focus position.

Japan patent 1,500,995 shows amplitude detecting a focus error signal on both the leading and trailing portions about the peak amplitude. This detection system requires two separate amplitude detectors; it is desired to use a single amplitude detector for indicating a near focus condition at one extremity of a linear region of the focus error signal normally used for focus maintenance.

Hsieh et al U.S. Pat. No. 4,674,076 shows using a differentiator in an optical disk servos in a negative feedback loop. This reference does not show nor suggest modifying a focus error signal for enhancing detection of a predetermined near-focus position.

Mansour et al U.S. Pat. No. 3,883,689 shows using differentiators to differentiate focus error signals. Such differentiated focus error signals are not used to process an individual focus error signal; rather, the differentiated signals from two different cameras are differentially compared for synchronizing focus between the two cameras. This reference also appears not to modify a focus error signal for enhancing detection of near-focus using but a single amplitude threshold and with high reliability.

Harigae et al U.S. Pat. No. 4,368,526 shows a differentiator processing a focus error signal to a amplitude detector. The resultant amplitude detected signal is AND gated with a full-rectified focus error signal to set a flip-flop for indicating a near-focus condition. In other words, the near focus detection is based solely on the differentiated focus error signal and not a processed or modified focus error signal which maintains a linear region for focus maintenance.

In clear contradistinction to this teachings, applicants' invention provides a focus acquisition system using a single amplitude detection crossing with enhanced discrimination by slimming the focus error peak signal. It is found that this system provides a facile and inexpensive focus acquisition system which is accurate, uses minimum power, and quickly and reliably acquires focus on a repeated basis.

SUMMARY OF THE INVENTION

It is an object of the present invention to provide enhanced focus acquisition using amplitude detection and a formed focus error signal which enhances reliability of such amplitude detection.

In accordance with the invention, an objective lens is moved toward an in-focus position with respect to a focal plane, i.e. such as a surface of a data storing member. A focus error signal is generated indicating an approach to a linear region of such focus error signal by a peak amplitude; such linear region is disposed across the desired in-focus condition and is used as a parameter in maintaining any acquired focus. The focus error signal is processed for producing a modified focus error signal by moving the peak closer to a desired in-focus position of a lens being focussed. A single amplitude detection on the modified focus error signal indicates that the lens being focussed has reached a near focus condition which is in an extremity of said linear region. Enhanced near focus detection is achieved by also slimming the focus error peak signal at the near focus position of the lens with respect to said focal plane.

In a preferred form of the invention, all focus error signal processing is achieved by first differentiating the focus error signal; second subtracting the differentiated focus error signal from the focus error signal to produce a modified focus error signal having both the peak shift toward a desired in-focus position of the lens and a slimmed peak signal.

The foregoing and other objects, features and advantages of the invention will be apparent from the following more particular description of preferred embodiments of the invention, as illustrated in the accompanying drawings.

DETAILED DESCRIPTION

Figure 1:
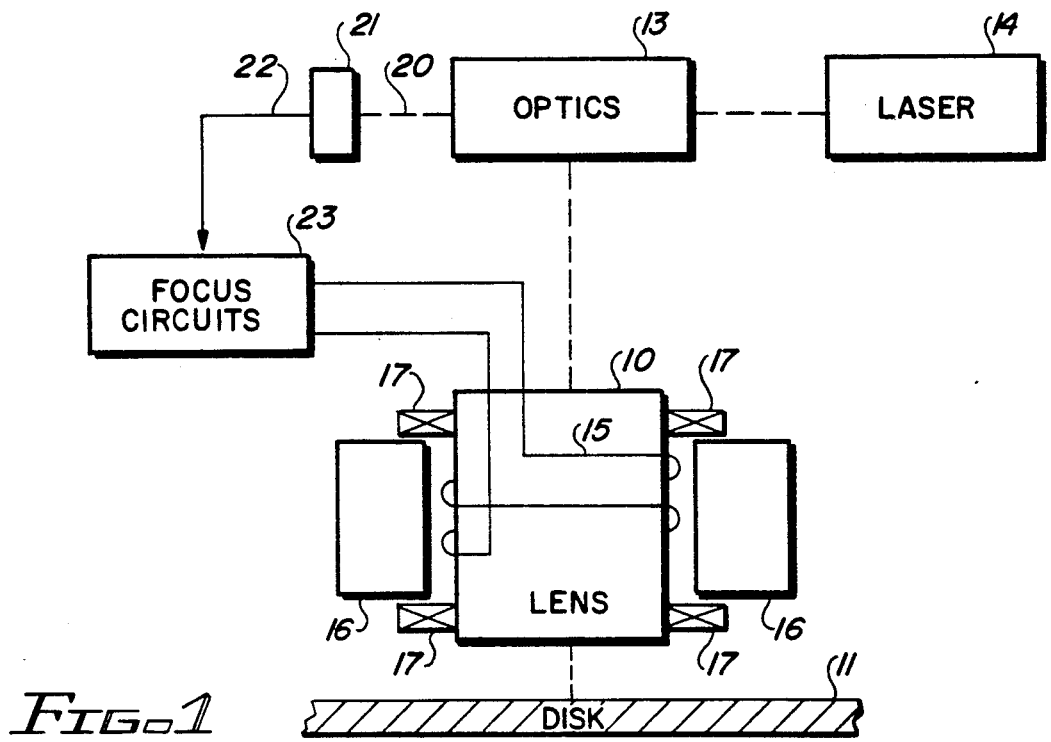
FIG. 1 is a simplified diagrammatic showing of a focusing system employing the present invention in an optical disk apparatus.

Referring more particularly to the appended drawing, like numerals indicate like parts of structural features in the various figures. An objective lens 10 is to provide focus of a beam 12 on disk 11 for recording or sensing information on the disk 11. The beam 12 is aligned with the optical axis of objective lens 10 in the usual manner. Optics 13, of usual design in optical disk recorders, optically couples the objective lens 10 to a laser 14 for receiving the light beam that travels along path 12. A focusing coil 15, mounted about the lens 10 and preferably movable therewith, generates magnetic fields which co-act with the stationary magnetic fields from permanent magnet 16 which are suitably mounted on a frame (not shown). A set of bearings 17 slidably support lens 10 for movement along its optical axis. It is to be understood that track seeking and track following motions which are perpendicular to the optical axis of lens 10 are provided in the usual manner.

Disk 11 reflects the laser 14 supplied light through objective lens 10 to optics 13. Optics 13 in a usual manner redirects the reflected light along path 20 to focus detector 21. Focus detector 21 supplies a focus error signal FES over electrical line 22 to focus circuits 23. Focus circuits 23 are coupled to coil 15 by a pair of signal lines 24 for supplying appropriate focus control signals, as will become apparent.

Figure 2:
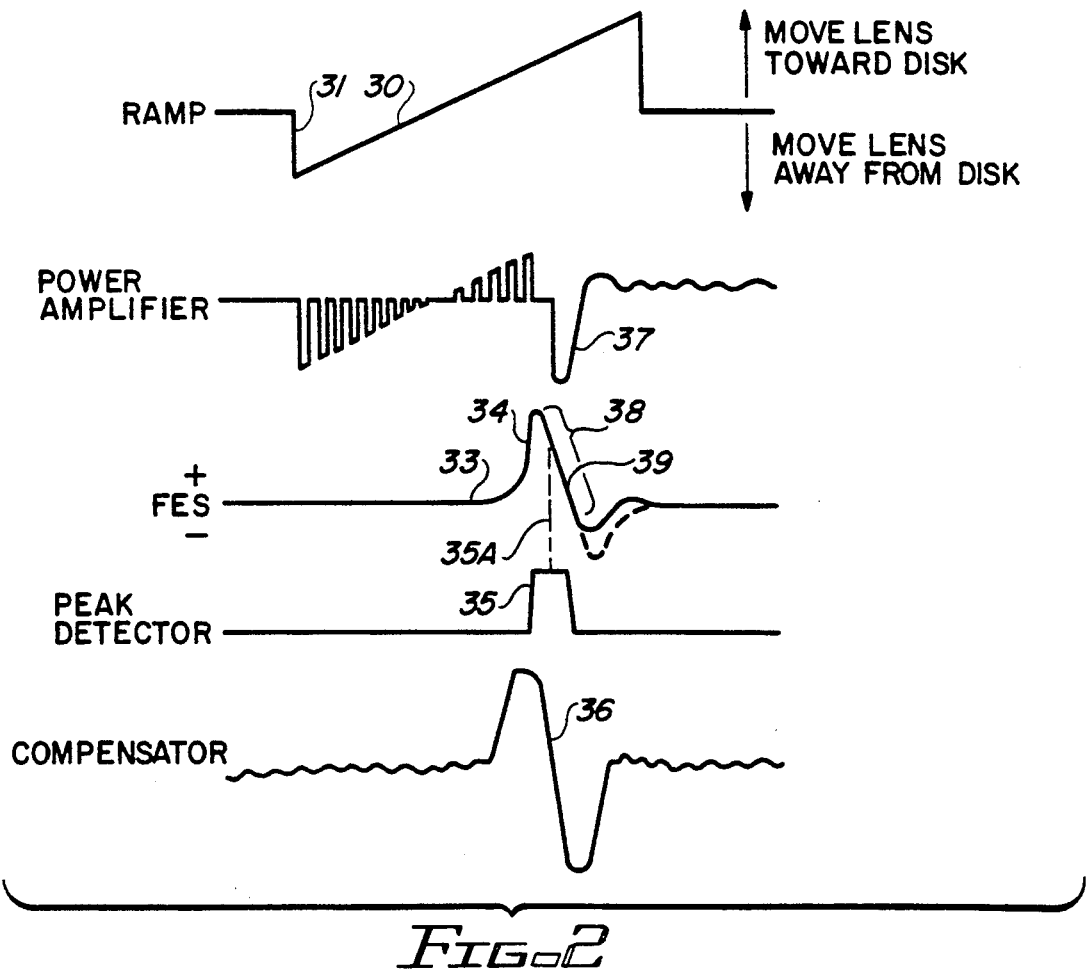
FIG. 2 shows a set of idealized wave forms used to broadly illustrate the operation of the FIG. 1 illustrated apparatus.

FIG. 2 illustrates an open loop position control signal 30 in the shape of a ramp which is designed to move the objective lens 10 toward the disk 11 for acquiring focus of the laser 14 beam. Initially, at reverse step 31 lens 14 is moved by signal 30 to a most remote position, i.e., furthest position away from disk 11 which is a clear out-of-focus condition as indicated by the signal 33 portion of FES. Ramp 30 is modulated as represented by position control pulses 32. The position control pulses 32 momentarily and repeatedly urge the lens 10 to move closer to the in-focus position, i.e., away from the position indicated by numeral 31. The lens 10 is allowed to coast between each successive pulse 32, thereby providing a soft control of the lens 10 movement within bearings 17. The pulse control tends to overcome any stiction or friction which would cause lens 10 to bind and tend not to move toward disk 11. Intermediate lens 10 coasting prevents accumulation of difference between the actual lens 10 position and the desired position indicated by ramp 30. Pulses 32 are modulated within a power amplifier as will become apparent.

The focus error signal at 33 indicates a complete out-of-focus condition of positive excursion 34 indicates an approach to the in-focus position at point 39 that is at the mid-point of linear region 38. The peak 34 is detected resulting in a peak detected output signal 35. Practicing the present invention has the effect of time delaying or shifting the signal used to detect near focus; i.e. the leading edge of output pulse 35 is shifted spatially to dashed line 35A. Line 35A is closer to the desired in-focus position, as will become apparent. Upon detection of near focus as indicated by pulse 35, stopping or reversing pulse 37 stops the lens 10 within the focus maintenance zone of point 39 such that the focus maintenance servos (not shown) maintain the focus of the lens at point 39. Focus control circuits include a compensator which provides a modification of control to the power amplifier as represented by numeral 36 in FIG. 2, when selected.

Figure 3:
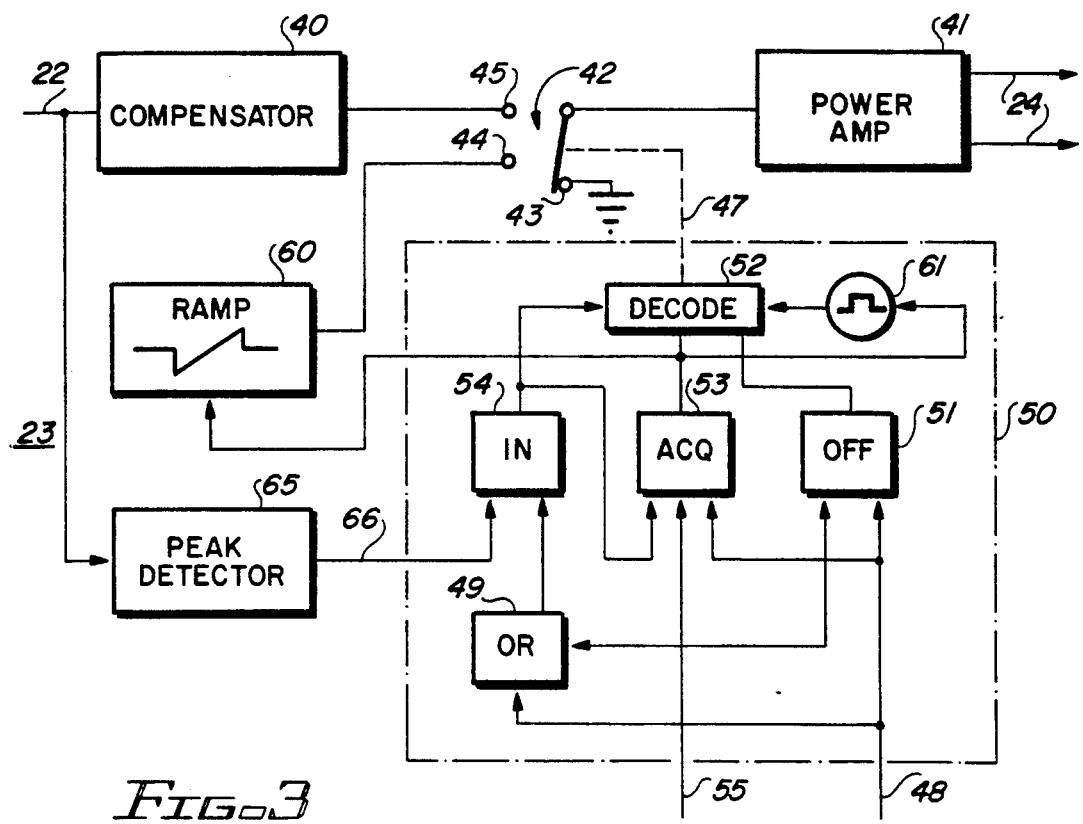
FIG. 3 is an in-focus detection and focus acquisition system usable with the FIG. 1 illustrated apparatus.

FIG. 3 illustrates, in block diagram form, first-described focus acquire circuits of focus circuits 23. FES on line 22 is supplied to compensator 40 which provides the function 3 shown in FIG. 2. Compensator 40 is in that portion of the focus circuits which maintains in-focus conditions. Power amplifier 41 supplies the signals over lines 24 to focus control coil 15. Electronic switch 42 is electrically actuated as will become apparent. At terminal 43, the power amplifier 41 is set to a voltage reference, such as ground reference potential. At this point, no signals are supplied over lines 24, hence the lens 10 is not moved. Terminal 44 connects the power amplifier 41 to later described focus acquisition circuits which generate the ramp 30. Terminal 45 is connected to compensator 40 and is used during focus maintenance conditions, i.e. after the lens 10 has reached the in-focus position.

Control of switch 42 is indicated by dashed line 47 which is controlled by focus state control 50. On power on, the actual location of lens 10 is not known. The power on reset signal supplied over line 48 sets the off flip-flop 51 to the active state. Off flip-flop 51 sends a signal to decode circuit 52 which in turn responds by actuating switch 42 to position 43 such that lens 10 is not inadvertently actuated during power up sequencing. The line 48 power on reset signal also travels through OR circuit 49 to reset in-focus indicating "IN" flip-flop 54 and also resets acquire ACQ flip-flop 53. In this machine state, lens 10 resides in a initial unknown position.

To acquire focus i.e., move lens 10 to the in-focus position, a focus acquire signal on line 55 sets ACQ flip-flop 53 to the active condition for initiating focus acquire, it carries the signal through OR circuit 49 to again reset the in-focus condition flip-flop 54 and reset OFF flip-flop 51. Resetting IN flip-flop 54 also enables reacquiring focus in the case that focus was lost or it is desired to recalibrate and reacquire focus in error recovery procedures. As soon as ACQ flip-flop 53 is set to the active condition, three operations occur simultaneously. ACQ flip-flop 53 actuates ramp generator 60 to generate the ramp signal 30 which is initially designed to move the lens 10 to the remote out-of-focus position. Ramp generator 60 then supplies the ramp to terminal 44. Pulse generator 61 supplies pulses to decode circuit 52 to repeatedly actuate switch 42 to move the connections of power amplifier 41 input between terminals 43 and 44 thereby generating the pulses 32. Decode circuit 52 receives the ACQ flip-flop 53 active signal for passing the pulses from pulse generator 61. This is the second state of the three state machine control 50.

During the pulse soft movement of lens 10 from the remote auto focus position towards the in-focus position, peak detector 65 monitors FES on line 22 for detecting peak 34. As later described, peak detector 65 contains the circuits illustrated in FIGS. 5 and 6. It is well known that FES near the in-focus position 39 has a maximum peak amplitude 34 which defines a remote auto focus extremity of a focus maintenance linear region on which point 39 resides i.e., straight line 38 portion of FES. IN flip-flop 54, when set, supplies an activating signal to decode 52 which responds to actuate switch 42 to connect terminal 45 to power amplifier 41 for maintaining the focus just acquired. IN flip-flop 54 also is connected to the reset input of ACQ 53 for holding it in the reset state while an in-focus condition is maintained. At this point in time, compensator 40 being connected provides the compensation 36 shown in FIG. 2 which ensures god focus acquisition.

Figure 4:
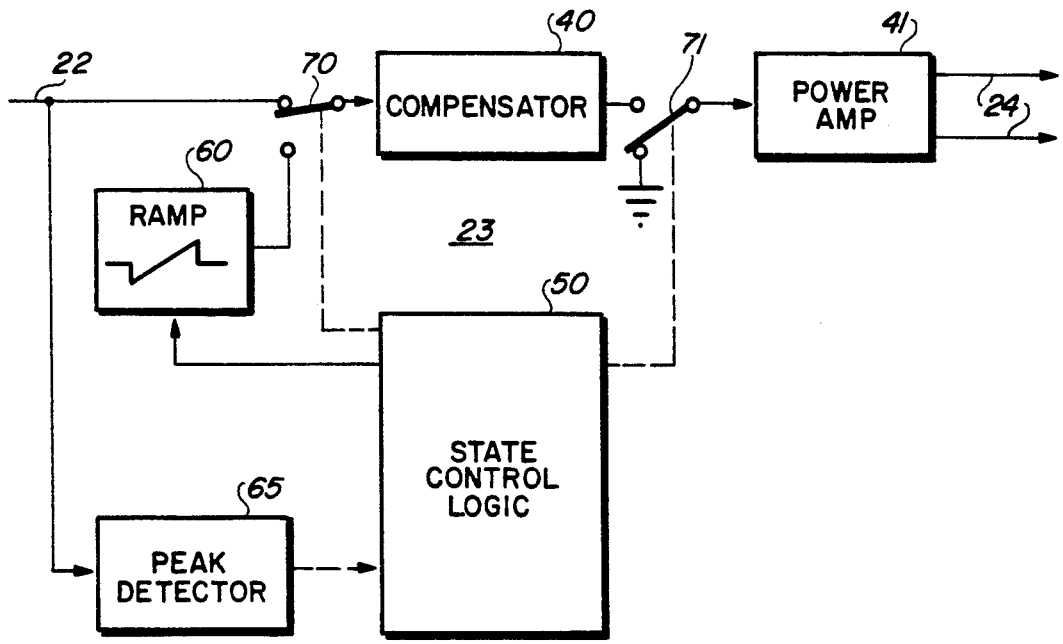
FIG. 4 is a block diagram showing an embodiment which is alternate to the FIG. 3 illustrated embodiment of focus acquisition control.

FIG. 4 is a simplified diagram using the same principles as shown in FIG. 3 but with using two electronic switches rather than a single electronic switch. Operation of the two circuits are identical. Switch 42 is replaced by two separate switches 70 and 71. Switch 70 connects ramp generator 60 through compensator 40 to power amplifier 41 as opposed to the direct connection shown in FIG. 3. This arrangement provides for better effect of compensator 40 action represented by numeral 36 of FIG. 2. During focus acquire state control logic 50 supplies an actuating signal to electronic switch 70 for moving it to connect ramp generator 60 to compensator 40. The generator of pulses 32 is achieved by switch 71 which is pulsed by state control logic 50 in the same manner as switch 42 was between terminals 43 and 44. In the reset or initial power on state, it is not known the electronic state of switches 70 and 71. The off control state of control 50 moves switch 71 to the ground reference potential and switch 70 to the position shown. Upon starting focus acquire, switch 70 is actuated to couple ramp 60 to compensate 40 and switch 71 modulates the ramp signal by momentary actuations by state control object 50. Upon acquiring focus, as indicated by peak detector 65, state control 50 actuates switch 70 to the illustrated position for connecting FES line 22 directly to compensator 40 and actuates switch 71 to couple compensator 40 to power amplifier 41.

Figure 5:
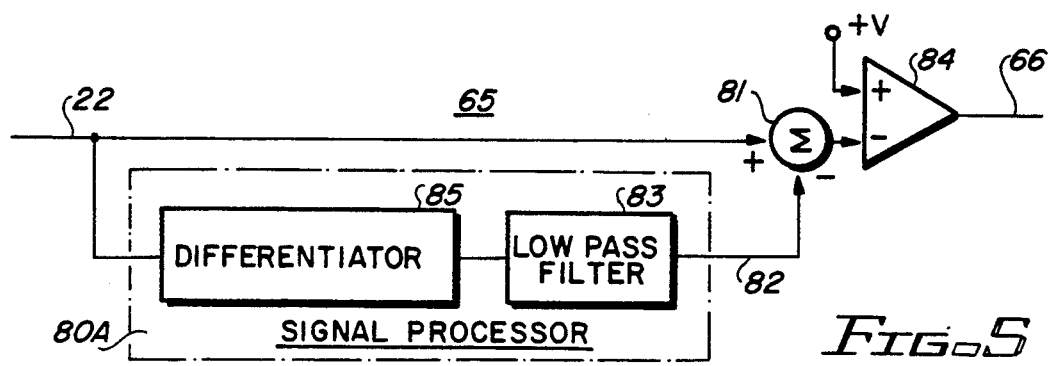
FIGS. 5 and 6 are circuit diagrams illustrating circuits to be used in a best mode of practicing the present invention for modifying the focus error signal and detecting a peak of such modified focus error signal for achieving the operations described with respect to FIG. 2.
Figure 7:
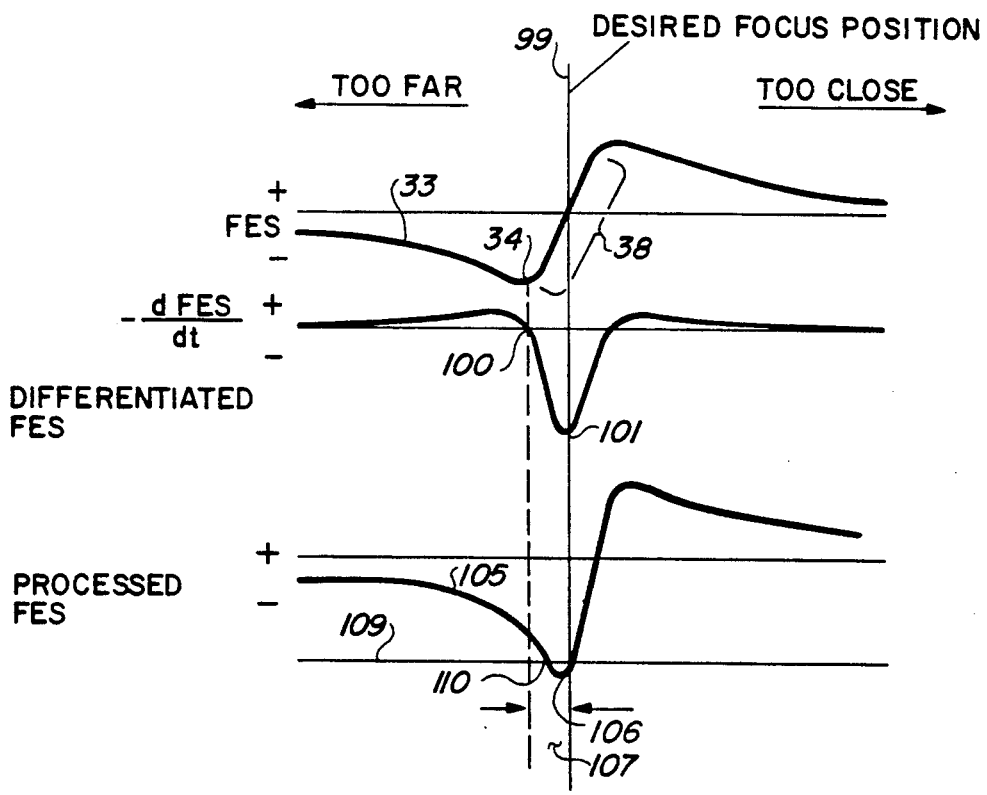
FIG. 7 shows a set of wave forms used to describe the operations of the focus acquisition using the circuits shown in FIGS. 5 and 6.

FIG. 5 illustrates a circuit showing internal construction of peak detector 65 for practicing the invention in a preferred form. Signal processor 80A receives FES from line 22. In signal processor 80A, differentiator 85 receives FES to produce a differentiated FES 100 (FIG. 7). A low pass filter 83 may be added to remove high frequency noise generated in signal processor 80A. Signal processor 80A is described by a LaPlace transform As/(s+p). In the transform "A" is a gain factor, "s" is the transform variable and "p" is the pole of the transfer function of signal processor 80A. The processed FES on line 82 is applied to the negative input of summing circuit 81 to be subtracted from FES applied to the positive (+) input of summing circuit 81. The processed signal 105 is applied to the negative (−) input of signal comparator 84 to be compared with threshold voltage +V (threshold 109 of FIGS. 7 and 8). The output signal of comparator 84 supplied over line 66 is a pulse occurring whenever the amplitude threshold 109 is first exceeded by the amplitude of the modified FES to indicate arrival of the lens 10 into the linear region 38.

Figure 6:
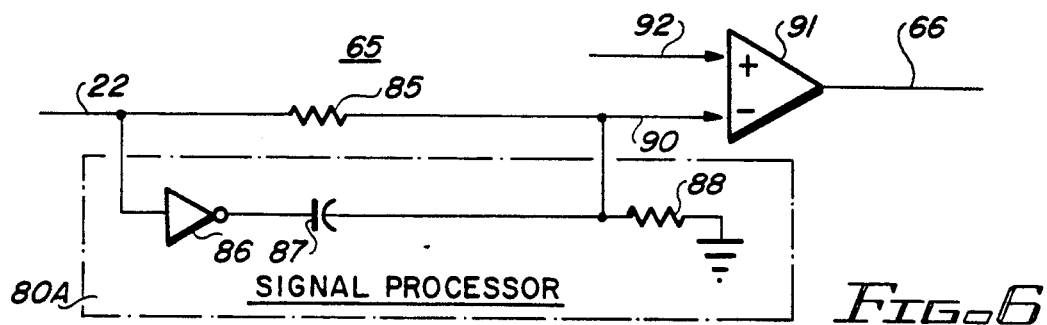

The best mode of practicing the invention includes using the FIG. 6 illustrated circuits in peak detector 65. FES on line 22 travels through resistor 85 to signal node 90. Node 90 is at the negative (−) input to switching comparator 91. FES also is applied to signal processor 80A which consists of a signal invertor 86 and a differentiator consisting of capacitor 87 and resistor 88. When FES is differentially carried by two signal lines, rather than illustrated as being carried on a single ended line 22, then one of the two electrical conductors of the differential pair of conductors is line 22, signal invertor 86 is replaced by the second of the two electrical conductors. In any event, the negative differentiated FES is applied to node 90 whereat it is subtracted from FES to produce the modified FES 105 at node 90. The modified FES is compared with a suitable threshold signal 109 applied to comparator 91 over line 92. The switching comparator 91 output pulse travels over line 66 to indicate arrival of the lens to the linear region 38.

Figure 8:
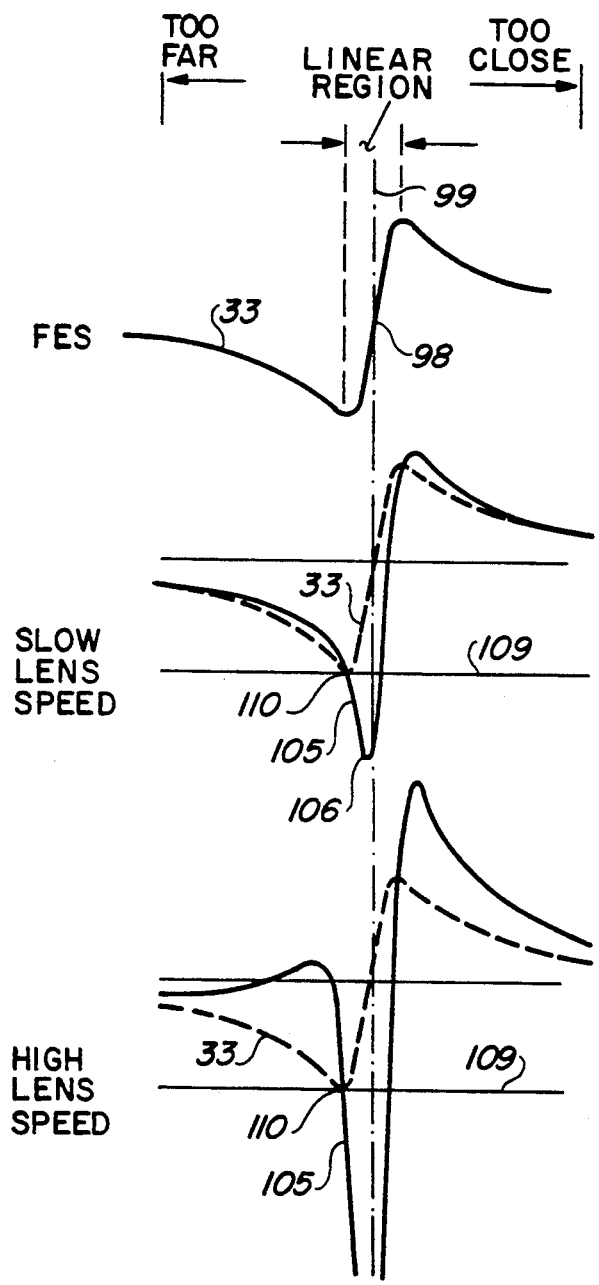
FIG. 8 shows a set of wave forms illustrating operation of the FIGS. 3 and 4 illustrated circuits when using the invention and when the lens speed along its optical axis is relatively slow or high.

FIG. 7 shows the operation of signal processor 80. The FES is shown as a reference to FIG. 2. The negative differentiated FES (DFES/dt) 100 has a peak amplitude coinciding with the desired in-focus position 99. The modified FES 105 (on either node 90 of FIG. 6 or line 82 in FIG. 5) has a peak amplitude at 106 which is closer to the desired in-focus position 99 by a distance 107 from the peak of FES. This shift in the spatial location of the peak amplitude places peak 106 within linear region 38. The peak portion of modified FES 105 is made more slim or narrower, as at detection point 110, than the FES. The narrower peak portion enables amplitude detection at a given amplitude threshold 109 to occur closer to the actual peak 106 than if the FES without signal narrowing were used. The amplitude threshold 109 is selected, as will later become more apparent, to provide detection of a near focus condition (lens 10 is in one extremity of linear region 38) such that a single amplitude threshold detection at point 110 reliably, quickly and easily indicates a near focus condition and that focus maintenance servos can now move the lens reliably to the desired focus position of lens 10. In FIGS. 7 and 8, moving to the left of line 99 indicates that lens 10 is too far from disk 11 for best focus while moving to the right of line 99 indicates lens 10 is too close to disk 11 for best focus.

FIG. 8 illustrates results of applying acquire system and method to an optical disk device. At a relatively slow speed of lens 10 (slow lens speed in FIG. 8) moving along its optical axis which is also transversely to the focal plane of lens 10 on disk 11 the FES amplitude is at its lowest values. Examination of the signals indicate that peak 106 is still well within linear region 38 resulting in reliable detection of said near focus condition. Similarly, at high lens speed, the differentiated FES has a much larger amplitude; still, detection point 110 is still within an extremity of linear region 38. Accordingly, using the inventive focus acquire enables greater tolerances in controlling lens 10 focus acquiring motions along its optical axis as lens 10 approaches the focal plane on disk 11.

While the invention has been particularly shown and described with reference to preferred embodiments thereof, it will be understood by those skilled in the art that various changes in form and details may be made therein without departing from the spirit and scope of the invention.

What is claimed is:

1. In a machine-effected method of acquiring focus of an objective lens with respect to a predetermined plane at which a light beam passing through the lens is to be focussed by moving the lens along its optical axis toward the plane, the machine-executed steps of:

moving the lens toward the focal plane for reaching a desired focus position;

during said moving, sensing and generating a focus error signal (FES) which indicates a current focus condition of the lens with respect to said focal plane and having a peak amplitude indicating onset of a linear region of focus control;

during said moving, processing said FES to produce a modified FES having a peak amplitude closer to said desired focus position than said peak amplitude of said FES; and amplitude detecting said peak amplitude of said modified FES for indicating said near focus condition.

2. In the method set forth in claim 1, said FES having a peak portion having said maximum amplitude for indicating said onset of said linear region, said peak portion having a predetermined width, further including the machine-executed steps of:

in said processing step, reducing the width of said peak portion to provide a modified peak portion in said modified FES that has a width less than said predetermined width.

3. In the method set forth in claim 2, further including the machine-executed steps of:

during said processing step, low band pass filtering the FES for rejecting high frequency noise.

4. In the method set forth in claim 1, further including the machine-executed steps of:

in said processing step, differentiating FES to produce signal FES', subtracting said FES' from said FES to produce said modified FES.

5. In the method set forth in claim 4, further including the machine-executed of:

upon detecting near focus condition, applying a predetermined braking drive to said lens for ensuring in-focus capture.

6. In the method forth in claim 5, further including the machine-executed of:

in said detecting step, upon detecting that the amplitude of said modified FES exceeds said amplitude threshold, producing a narrow signal for indicating said near focus condition.

7. In a machine-effected method of acquiring focus of an objective lens with respect to a predetermined focal plane at which a light beam passing through the lens is to be focussed by moving the lens along its optical axis to an in-focus position, the machine-executed steps of:

generating a focus error signal (FES);
differentiating said FES;
subtracting said differentiated FES from said FES to produce a modified FES; and
detecting a peak of said modified FES for indicating a near focus condition of the lens with respect to said in-focus position.

8. In the method set forth in claim 7, further including the machine-executed steps of:

establishing a signal amplitude threshold; and
comparing amplitude of the modified FES with said threshold and indicating said near focus condition of said lens as the amplitude of the modified FES exceeds said threshold before reaching the actual peak amplitude of said modified FES.

9. In optical device having an optical record medium and optics for sending and receiving a light beam to and from the record medium, the optics including a lens movable along its optical axis toward and away from the focussing the light beam at the record medium, the improvement including, in combination;

a lens position control means coupled to the lens for moving same along its optical axis for focussing the light beam at a focal plane of the record medium;

focus detection means optically coupled to the lens for receiving light reflected from the record medium for indicating focus error as a focus error signal FES;

focus correction means coupled to the focus detection means and to the control means for responding to the indicated focus error for actuating the control means to move the lens toward a best focus position whereat the light beam is focussed at the focal plane; and focus acquisition means coupled to the focus correction means, to the focus detection means and to the control means for overriding the focus correction operation to move said lens toward the best focus position including a signal processor for modifying said FES by shifting a peak amplitude of FES toward said best focus position.

10. In the optical device set forth in including, in combination:

said focus acquisition means including a differentiator means for differentiating said FES to produce a differentiated FES; and signal summing means connected to said differentiator means for receiving said differentiated FES and receiving said FES for subtracting said differentiated FES from said received FES to produce a modified FES.

11. A focus acquisition means for moving a lens along its optical axis toward an in-focus position, including, in combination;

means for supporting and moving the lens along its optical axis for focussing the lens;

means for detecting an focus error of the lens for generating a focus error signal FES and detecting a near focus condition; and circuit means connected to the detecting means for differentiating said FES, then subtracting the differentiated FES from the FES to produce a modified FES for enhancing said detection of the near focus condition.

12. In the means set for in claim 11, further including, in combination;

stopping means connected to said detecting means and to said moving means for responding to said detecting means indicating said near focus condition to momentarily actuate said moving means to brake the lens motion for acquiring focus; and focus maintenance means coupled to the detecting means, to said moving means and to said stopping means for actuating the moving means to maintain focus after said stopping means actuated said moving means to brake the lens motion.

* * * * *

UNITED STATES PATENT AND TRADEMARK OFFICE
CERTIFICATE OF CORRECTION

PATENT NO.　: 　5,233,585
DATED　　　: 　August 3, 1993
INVENTOR(S): 　James J. Dente, et al.

It is certified that error appears in the above-identified patent and that said Letters Patent is hereby corrected as shown below:

At column 7, line 46, the words "detecting near focus" should be --detecting said near focus--.

At column 8, line 11, the words "the focussing the light" should be --the record medium for focussing the light--.

At column 8, line 33, the words "set forth in including" should be --set forth in claim 9, further including--.

Signed and Sealed this

Fifth Day of April, 1994

BRUCE LEHMAN

Attest:

Attesting Officer　　Commissioner of Patents and Trademarks